G. J. DYE.
REGISTER FOR WEIGHING SCALES.
APPLICATION FILED JUNE 18, 1910.

984,362.

Patented Feb. 14, 1911.

3 SHEETS—SHEET 1.

WITNESSES:

INVENTOR
Garnett J. Dye
BY
ATTORNEYS

G. J. DYE.
REGISTER FOR WEIGHING SCALES.
APPLICATION FILED JUNE 18, 1910.

984,362.

Patented Feb. 14, 1911.

3 SHEETS—SHEET 2.

WITNESSES:

INVENTOR
Garnett J. Dye

BY
ATTORNEYS

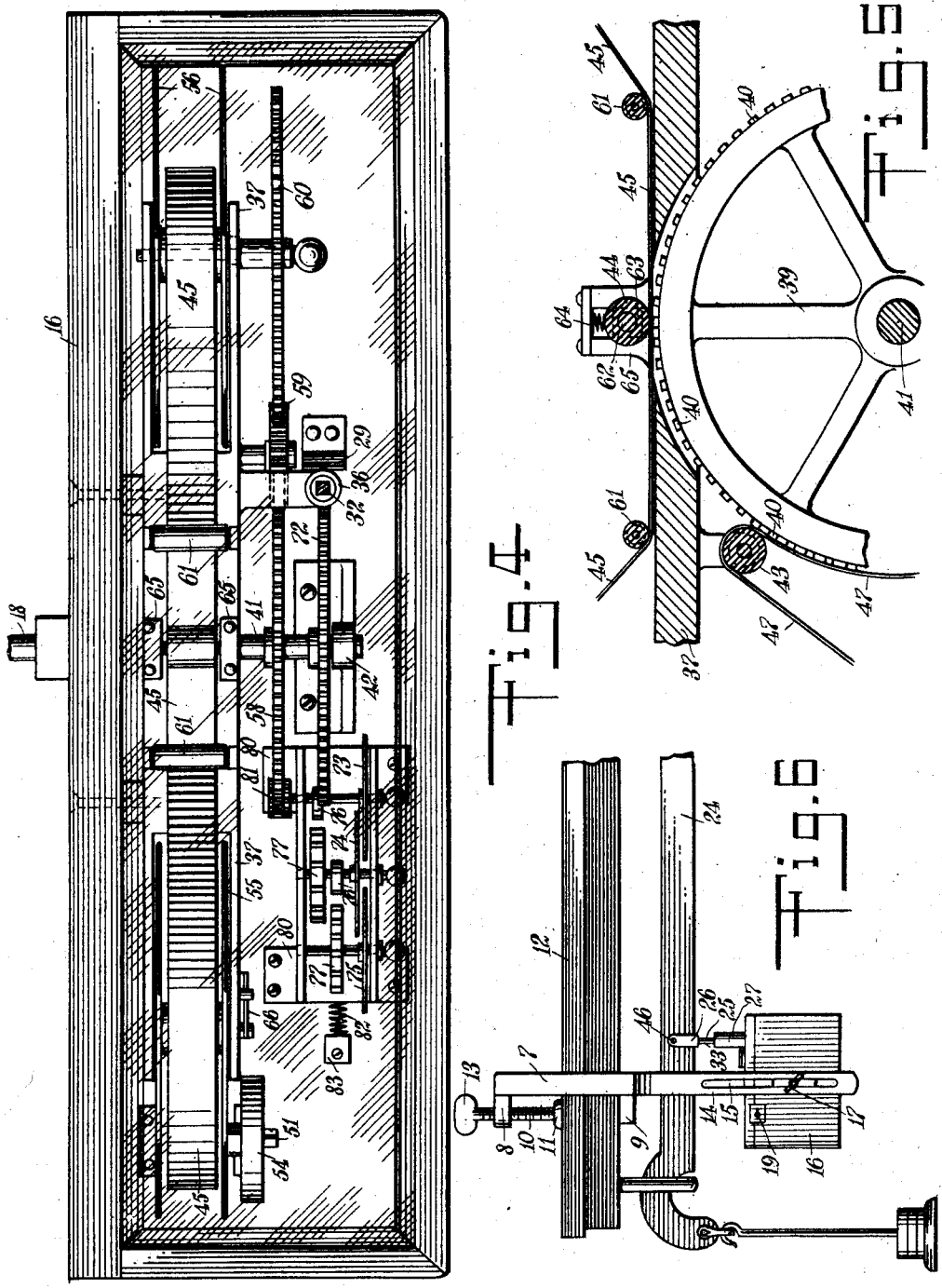

UNITED STATES PATENT OFFICE.

GARNETT J. DYE, OF FLORENCE, ALABAMA.

REGISTER FOR WEIGHING-SCALES.

984,362.

Specification of Letters Patent.   Patented Feb. 14, 1911.

Application filed June 18, 1910.   Serial No. 567,597.

*To all whom it may concern:*

Be it known that I, GARNETT J. DYE, a citizen of the United States, and a resident of Florence, in the county of Lauderdale and State of Alabama, have invented a new and Improved Register for Weighing-Scales, of which the following is a full, clear, and exact description.

Among the principal objects which the present invention has in view are: to provide a registering mechanism attached to the beam of a scale for producing a permanent and transient record indicative of the operation of the scale; to provide inking means for the said mechanism and for the permanent record thereof; to provide connective means for the register with the scale beam, flexible in character to accommodate the irregular movements of said beam; and to provide a mechanism simple in character and efficient and durable in construction.

One embodiment of the present invention is disclosed in the structure illustrated in the accompanying drawings, in which like characters of reference denote corresponding parts in all the views, and in which—

Figure 1:
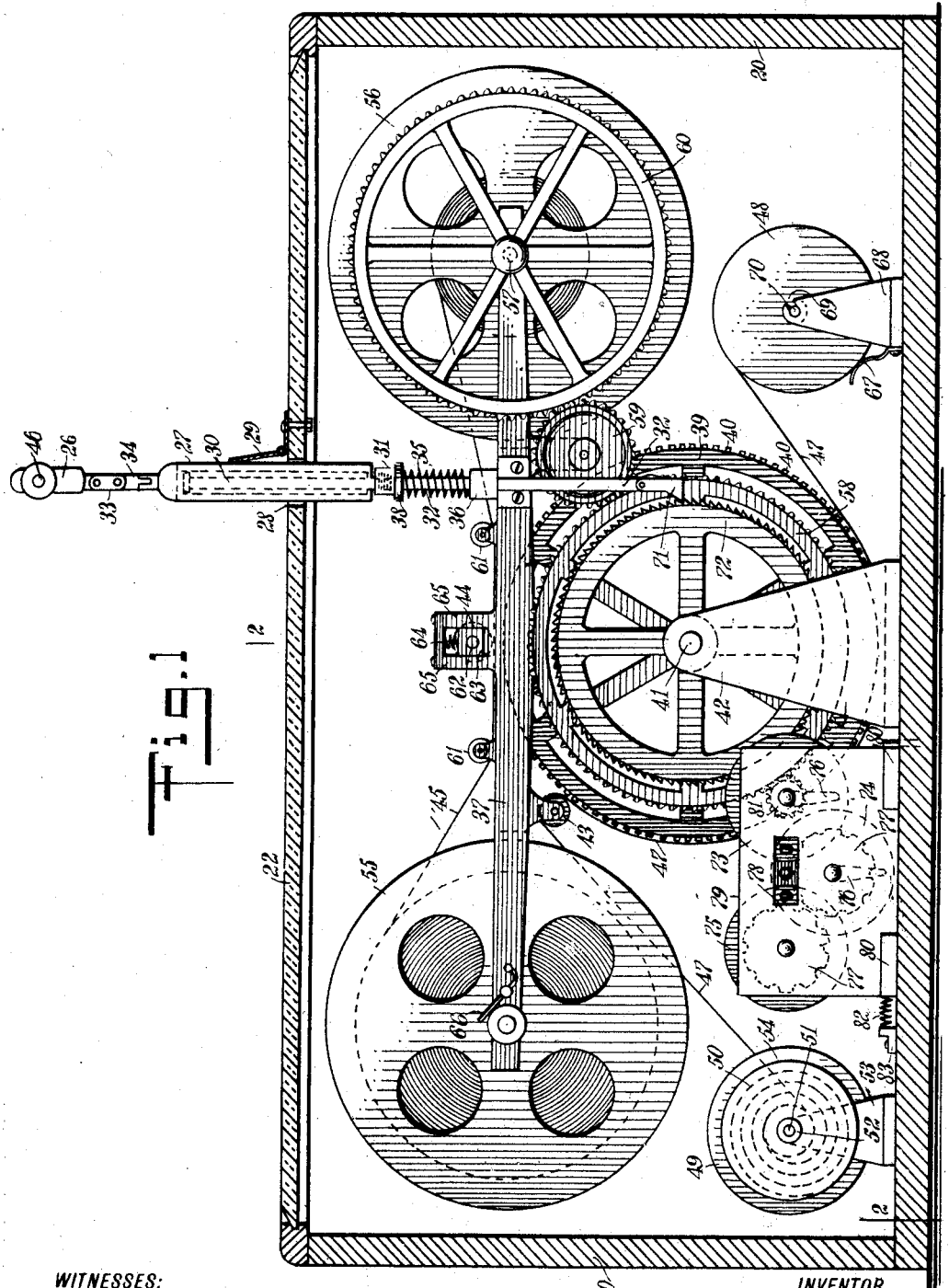
Figure 2:
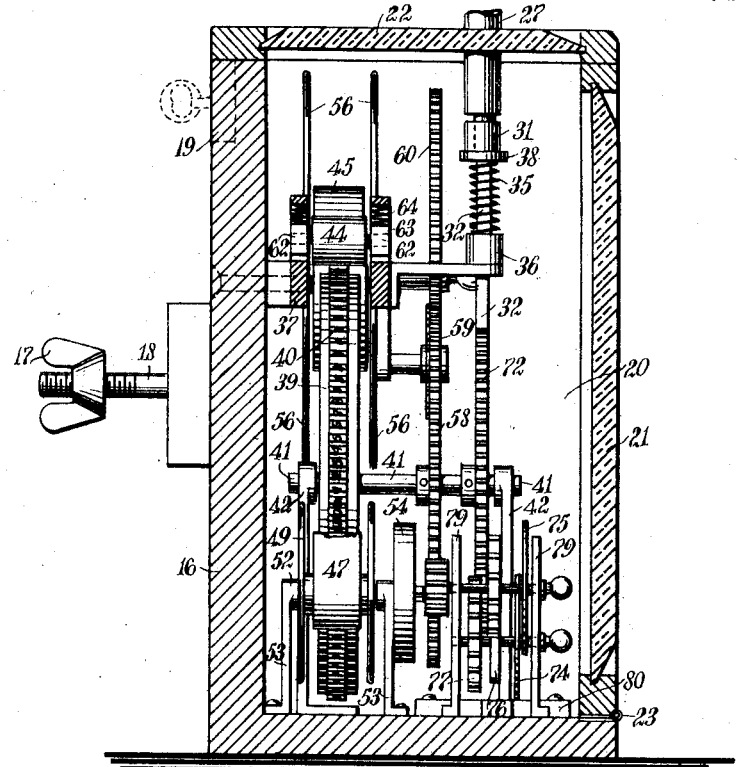
Figure 3:
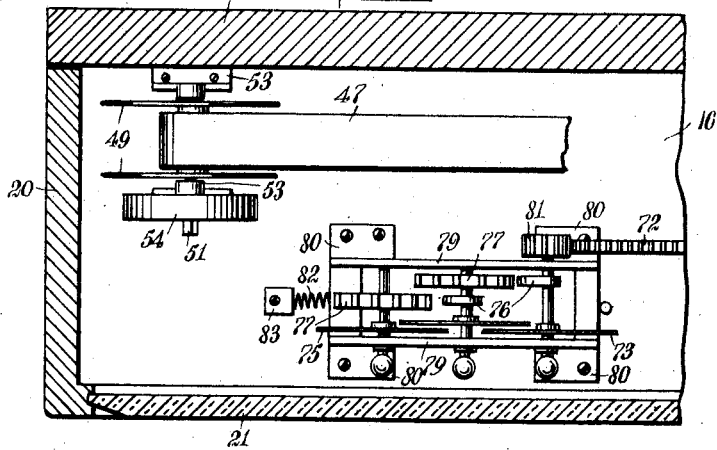

Figure 1 is a longitudinal vertical section of a register constructed in accordance with the present invention; Fig. 2 is a vertical cross section taken on the line 2—2 in Fig. 1; Fig. 3 is a fragmentary view in horizontal section, illustrating in plan the inking ribbon and winding spool therefor, the visible register and operating mechanism therefor; Fig. 4 is a top plan view of a register constructed and arranged in accordance with the present invention; Fig. 5 is a fragmentary view in detail and on an enlarged scale, of the permanent recording wheel and the recording inking device used in conjunction therewith; and Fig. 6 is a fragmentary view in side elevation, illustrating the means for attaching the register to a scale beam of suitable character.

The registering machine herein illustrated is independent of the scale to which it is applied. The method of applying the register is illustrated in Fig. 6, wherein a yoked bracket 7 is provided, said bracket having extension arms 8, and 9, the former being screw threaded to receive in threaded engagement a screw 10. The screw 10 is provided with a universal pressure foot 11, adapted to rest on the upper side of the frame 12 of the scale structure. The screw 10 is provided with a wing nut head 13.

The pressure foot 11 operates in conjunction with the arm 9, which is disposed beneath the frame 12, to form a clamp of known construction. The lower extension 14 of the bracket 7 is provided with an elongated slot 15, to which extension the casing 16 of the registering machine is fixedly attached by a wing nut 17, the collar whereof overrides the sides of the slot 15 and the body whereof is in threaded engagement with a screw stud 18.

The registering machine is of diminished size, and contained within the casing 16, being therein locked by a lock 19, the ends 20 being mounted on a front 21 and a top 22, and forming a frame which is hinged to the casing 16 by means of hinges 23, 23. The transmission device connecting the balance beam 24 of the scale, and the recording mechanism of the register, is a double knuckle plunger 25. The plunger 25 is bifurcated at the upper end to form a stirrup 26 which is pivoted at 46 to the beam 24. By means of the connection of the plunger 25 to the beam 24 the plunger is controlled to reciprocate in unison with the vibration of the said beam. The plunger 25 is separably connected with the operating mechanism of the register, having a hollow cylindrical tube 27 adapted to extend through a hole 28 provided in the top 22 of the casing 16. When the tube 27 is withdrawn from the hole 28 the latter is closed by a cap cover 29, as seen in Figs. 1 and 4 of the drawings. The tube 27 enfolds and forms a guide for a rod 30, the lower end of which is seated in a cup 31 formed on the upper end of a plunger 32. Between the tube 27 and the stirrup 26 are interposed links 33 and 34. The links 33 and 34 are disposed as shown in Fig. 1 of the drawings, to articulate in opposite directions, thereby forming a flexible connection between the mechanism for operating the register and the scale beam.

The scale beam is, in the present invention, controlled in its depression under the compulsion of weight on the platform by a spiral spring 35, which enfolds the plunger 32 in guided relation thereto. The spring 35 is seated within a cup 36, forming a part of the fixed structure of the framing beam 37. The upper end of the plunger 32 is provided with a cap 38, superimposed upon which is the cup 31. The cup 36 is provided in the bottom thereof with a perforation in which the squared or lower extension of the plunger 32 is guided. The spring 35 rests between the cap 38 and the cup 36, normally extending the one from the other, and raising, through its extreme elevated position, the plunger 32. When in the course of operation of the scale the beam 24 is depressed, the extent of the travel of the end of the said beam is controlled by the spring 35, the same yielding in proportion as the weight is increased on the platform of the scale. By means of this construction it will be seen that the end of the plunger 32 is moved over a path proportioned to the weight on the scale. The mechanism for recording the successive operations of the scale herein shown and described also records in characters indicating the total weight of each operation, employing the travel of the said plunger for this purpose.

The registering mechanism consists essentially of two distinct elements, the recording mechanism whereby permanent written or tabulated record is preserved, and a transient visible register produced for the inspection of the person in charge of the scale or the owner of the goods being weighed.

The mechanism for producing the permanent written record consists in a large type wheel 39, the periphery of which is provided with a multiplicity of type characters 40, 40, serially arranged and indicating successive units of increasing weight characters. The type wheel 39 is fixedly mounted on a shaft 41, which is mounted in bearings in standards 42. Disposed about the wheel 39, and in contact therewith, are rollers 43 and 44, the former operating to ink the successive type characters, and the latter operating to impress a paper ribbon 45 thereon to receive the character impression. The roller 43 is provided with a yielding surface, such as felt padding, and is disposed with relation to the wheel 39 so that the padding is firmly pressed upon the type characters 40, 40. An inking ribbon 47 is rolled on a reel 48 and passed under the type wheel 39, and between the same and the roller 43, thereby receiving the full pressure of the roller 43 upon the interposed inking ribbon. The inking ribbon 47 is passed over the roller 43 and carried to a reel 49, whereon it is wound as and when drawn from the reel 48. The reel 49 is rotated by a coiled spring 50, and is provided with a shaft 51 having a bearing in a boss 52 set rigidly out from a standard 53. The spring 50 is mounted within a fixed casing 54, and is fixedly attached to the shaft 51. By means of this arrangement a freshly inked ribbon section is continuously brought in contact with the type characters on the wheel 39.

The record ribbon 45 is, in the operation of the machine, passed from a reel 55 to a reel 56. This action is accomplished by the interposition between the axle 57 upon which the reel 56 is mounted and the shaft 41 upon which the type wheel 39 is mounted, of a train of gear wheels 58, 59 and 60. The wheels 58 and 60 are of equal diameter, therefore the rotary action of the wheels is equal. The wheel 58 being fixedly attached to the shaft 41, the action is simultaneous with the action of the type wheel 39, therefore the action of the type wheel 39 and the travel of the type ribbon 45 is synchronized.

The ribbon 45 is threaded under guide rollers 61, 61, and under the pressure roller 44. The pressure roller 44 is provided with trunnions 62 mounted in bearings in bearing blocks 63. The bearing blocks 63 are depressed by spiral springs 64 interposed between the blocks 63 and the heads of guides 65, 65. The reel 55 and the reel 48 are each retarded in their action by a drag spring 66 mounted on the framing beam 37 in the one instance, and a spring 67 mounted on a standard 68 having a slot 69 at the head thereof to receive in supporting relation the spindle 70 of the reel 48.

The operation of the mechanism thus far described is as follows: As stated, under varying load the compression of the spring 35 varies. The heavier load carries the plunger 32 downward to a greater extent than the same is carried by a lighter load. At the lower end the plunger 32 is provided with a pawl 71 which rides the teeth of a ratchet wheel 72. The ratchet wheel 72 has teeth equaling in number the type characters 40, 40 of the wheel 39. When now the weight is placed on the platform controlling the beam 24 to depress the same, the plunger 32 is depressed thereby. The pawl 71, engaging the teeth of the wheel 72, rotates the same, and by means of the said wheel rotates the type wheel 39. If the weight be such as to rotate the wheel 39 two of the type character spaces, the record of two such characters is imprinted on the ribbon 45 by the pressure of the roller 44 thereon compressing the same against the face of the type characters 40, which have, by the action described, been moved under the said roller. These two characters are successive of the characters just preceding, therefore the record, though recording two pounds, for the sake of illustration, will show a total record of the register, which may be 992 pounds. The next succeeding operation may depress the beam 24 to cause, through the plunger 32, a rotation of the type wheel 39 for five spaces. Each type character, as it passes under the roller 44, will receive its imprint, but at the end of the rotation it will be found that the last number records 997 pounds, or five successive numbers after the last previous operation. As the beam 24 rises between each weighing operation, the plunger 32 is raised to its highest position by the spring 35. In the retracting action of the plunger 32 the pawl 71 freely rides over the back of the teeth of the wheel 72, reëngaging the wheel at the top of the stroke of the plunger 32. This action continues, each successive load being recorded in proportion to the load weighed on the scales, and at the end of the day or week, or at the end of the record ribbon 45, the total will be expressed on the said ribbon.

For the purpose of the visible exposing of the total record I have provided a comptometer, consisting of three denominational wheels 73, 74 and 75, indicating units, tens and hundreds respectively. The train of wheels may be amplified, if desired, to carry the denominations above the three herein mentioned. Each of the lower denominational wheels is provided with a single tooth 76, 76, extended from the shaft carrying the wheel to which it is attached, and extended into the path of star wheels 77, with which all but the lowest denominational wheel is provided. The operation of the comptometer is well known, and all that is needed here to state is that the characters are formed when the periphery of each wheel or disk carried thereby is exposed through a peep hole 78 in the proper disposition to be read aggregately. The wheels of the comptometer in the present instance are mounted in plates 79, 79, which are connected in frame form, and are supported on the bottom of the casing 16 between guides 80, 80. The wheel 73 of the comptometer is provided with a small gear 81, the teeth whereof equal in number the unit denominations of the wheel 73, or, in other words, are ten in number. The pitch of the teeth equals the pitch of the teeth of the wheel 58 with which the said gear 81 is engaged. The purpose in mounting the plates 79 in guides is that the comptometer may be withdrawn from contact with the wheel 58 to rewind or set the wheels 73, 74 and 75, to initial position. To maintain the gear 81 in toothed engagement with the wheel 58 there is provided a spiral spring 82, the normal action of which is to press the plates 79 away from stop 83, which is fixedly attached to the frame of the machine.

When now the action above described of the recording mechanism occurs, the visible register, by means of the comptometer, is carried forward in a manner obvious from the drawings and description with reference to the disposition of the wheels 73, 74 and 75. By means of this construction the individual load may be at all times ascertained by observing the total previous to weighing the particular load and deducting the said total resulting from the operation of weighing the particular load. At the same time, the operator or other interested party, at all times has a visible record showing the total amount of weight which has passed over the scale for any particular purpose.

If desired, the casing 16 may at any time be opened by manipulating the lock 19, throwing back the top and front 21 and 22, and exposing the machinery of the register. In this position the parts may be adjusted so that the record may start at and from the zero point. Thus, if in the operation of the machine herein described, a car is being loaded, the register may be set and the scale to which it is attached will, by successive operations, show a totalizing result at all times. If the capacity of the car is 24,000 pounds, the party loading the car will be apprised by means of this register of the aggregate number of pounds at any time preceding the load to the stated capacity, and may be thereby either slightly over loaded or purposely under loaded, saving the damage which arises from an excessive overloading, and also saving the loss arising from an excessive under loading. Between the loading of each individual car, if desired, the machinery of the register may be changed so that the successive cars are registered from an initial loading point.

Having thus described my invention, what I claim as new and desire to secure by Letters Patent is:—

1. In combination with a weighing scales having a scale beam, a register, comprising a wheel having on the periphery thereof a plurality of printing characters serially denotative, said wheel being pivotally mounted in a stationary casing; a record ribbon operatively connected with said wheel; a presser roller disposed across said wheel and in pressing relation thereto, said roller being adapted to press the said ribbon on said wheel; spring actuated bearings for said presser roller for forcing the same upon the said wheel; transfer reels for said record ribbon operatively mounted on opposite sides of said presser roller; a train of gears operatively connecting said wheel and one of said transfer reels, arranged to move the said record ribbon in harmony with the said wheel; a plurality of guide rollers for controlling said record ribbon; and a transmission mechanism connecting said wheel with the oscillated scale beam.

2. In combination with a weighing scales having a scale beam, a register, comprising a printing mechanism having a plurality of printing characters serially denotative; a flexible transmission mechanism adapted to be fixedly attached to the scale beam and provided with a pawl and ratchet connection with the said printing mechanism to operate the same; a record ribbon operatively connected with said printing mechanism; and means for moving said record ribbon.

3. In combination with a weighing scales having a scale beam, a register, comprising a wheel having on the periphery thereof a plurality of printing characters serially denotative, said wheel being pivotally mounted in a stationary casing; a transmission mechanism adapted to be fixedly attached to the scale beam and having a series of oppositely movable links and a pawl engaging member at the inner end of said transmission mechanism; a ratchet wheel fixedly connected with said printing wheel held in operative relation to said pawl; a record ribbon operatively connected with said printing wheel; and means for moving said record ribbon.

4. In combination with a weighing scales having a scale beam, a register, comprising a wheel having on the periphery thereof a plurality of printing characters serially denotative, said wheel being pivotally mounted in a stationary casing; a transmission mechanism adapted to be fixedly attached to the scale beam and having a series of oppositely movable links and a pawl engaging member at the inner end of said transmission mechanism; a ratchet wheel fixedly connected with said printing wheel held in operative relation to said pawl; a record ribbon operatively connected with said printing wheel; means for moving said record ribbon; and a comptometer connected to said wheel to operate in unison therewith.

5. In combination with a weighing scales having a scale beam, a register, comprising a wheel having on the periphery thereof a plurality of printing characters serially denotative, said wheel being pivotally mounted in a stationary casing; a transmission mechanism adapted to be fixedly attached to the scale beam and having a series of oppositely movable links and a pawl engaging member at the inner end of said transmission mechanism; a ratchet wheel fixedly connected with said printing wheel held in operative relation to said pawl; a record ribbon operatively connected with said printing wheel; means for moving said record ribbon; a large gear wheel fixedly connected with the printing wheel; and a comptometer embodying a plurality of serially connected gear wheels and character marked disks, said comptometer being connected with said large gear wheel to operate in unison with said printing wheel, and said comptometer being mounted in sliding relation to said large gear wheel to be moved from engagement therewith.

In testimony whereof I have signed this specification in the presence of two subscribing witnesses.

GARNETT J. DYE.

Witnesses:
A. B. CAMPER,
HENRY A. BRADSHAW.